US012469472B2

(12) United States Patent
Lin et al.

(10) Patent No.: US 12,469,472 B2
(45) Date of Patent: Nov. 11, 2025

(54) CHOLESTEROL LIQUID CRYSTAL DISPLAY AND DRIVING METHOD THEREOF

(71) Applicant: IRIS OPTRONICS CO., LTD., Tainan (TW)

(72) Inventors: Hui-Cheng Lin, Tainan (TW); Cheng-Hong Yao, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/585,041

(22) Filed: Feb. 22, 2024

(65) Prior Publication Data

US 2025/0225949 A1 Jul. 10, 2025

(30) Foreign Application Priority Data

Jan. 5, 2024 (TW) ................................ 113100654

(51) Int. Cl.
*G09G 3/36* (2006.01)

(52) U.S. Cl.
CPC ... *G09G 3/3696* (2013.01); *G09G 2300/0486* (2013.01); *G09G 2310/06* (2013.01)

(58) Field of Classification Search
None
See application file for complete search history.

(56) References Cited

FOREIGN PATENT DOCUMENTS

KR 20040082504 A * 9/2004

OTHER PUBLICATIONS

Translation of KR-20040082504-A into English; Choi et al. (Year: 2004).*

* cited by examiner

*Primary Examiner* — Brian M Butcher
(74) *Attorney, Agent, or Firm* — Cheng-Ju Chiang

(57) ABSTRACT

The present invention is a cholesterol liquid crystal display and driving method thereof. The cholesterol liquid crystal display includes a display panel and a liquid crystal driving unit. The display panel is used to display images composed of a row of imaging drive pixels and multiple rows of non-imaging drive pixels. The liquid crystal driving unit simultaneously drives the display panel to show images by applying a first driving voltage to multiple non-imaging drive pixels and a second driving voltage to imaging drive pixels. The first driving voltage has a quantity of the first pulse waves within a unit time, and the second driving voltage has a quantity of the second pulse waves within the unit time. The quantity of the first pulse waves is at least 5 times greater than the quantity of the second pulse waves, and the higher the multiple, the better the display effect.

20 Claims, 16 Drawing Sheets

CHOLESTEROL LIQUID CRYSTAL DISPLAY AND DRIVING METHOD THEREOF

BACKGROUND OF THE INVENTION

1. Field of the Invention

The present invention relates to a cholesterol liquid crystal display and a driving method thereof, and in particular, to a cholesteric liquid crystal display and its driving method that uses a variety of high-frequency bands to improve contrast and increase reflectivity to enhance the user's viewing experience when the display is within a unit time in the Non-Selection state.

2. Description of Related Art

Currently, the prevalent method for controlling cholesteric liquid crystal displays is through a Pulse Modulation (PM) driving mode. This mode encompasses Pulse Width Modulation (PWM), Dynamic Drive Scheme (DDS) driving modes, and other compound curve driving modes. In the PWM driving mode, there are two stages: Selection stage and Non-Selection stage. The DDS driver mode comprises four stages: Prepare stage, Selection stage, Evo stage, and Non-Selection stage. Besides, the compound curve driving mode consists of three stages: Manipulation stage, Selection stage, and Non-Selection stage. In the light, in all PM driving modes, while the Non-Selection stage is implemented, the image effect of the cholesteric liquid crystal display will be adversely affected.

In the prior art, a cholesteric liquid crystal display comprises upper and lower substrates with electrodes arranged on them, and the electrode directions on the upper and lower substrates intersect. One electrode functions as the COM electrode, and the other as the SEG electrode. The voltage supplied to the SEG electrode comprises both the bright state voltage and the dark state voltage. On the other hand, the voltage supplied to the COM electrode includes two kinds of voltages during both the Selection stage and the Non-Selection stage. This enables the application of different liquid crystal voltages to various areas during screen refresh resulting in the display of different color levels Refer to FIGS. 1 to 6. It is evident that, in the complete waveforms of both the traditional PWM driving mode and DDS driving mode, the frequencies of the Non-Selection stage and the Selection stage are the same. Moreover, there must be at least one positive half waveform accompanied by at least a negative half waveform to complete the entire driving pattern. When at least one of the COM electrodes is activated for screen imaging (including the Selection stage, EVO stage, Prepare stage, Manipulation stage, etc.), the remaining COM electrodes are activated to carry out actions in the Non-Selection stage. It has an impact on the overall display effect of the screen.

As shown in FIG. 7, when the prior art displays an image of a bottle cap, an evident black shadow appears at the center of the screen, resulting in a suboptimal viewing experience for the user. If the hardware is adjusted to improve the contrast of the black shadow, then making it more pronounced.

Therefore, to enhance the user's viewing experience and adjust the contrast and reflectivity of the cholesteric liquid crystal display, it is imperative to develop optimal technical methods to address the aforementioned issues.

SUMMARY OF THE INVENTION

The objective of the present invention is to enhance the display effect of a cholesteric liquid crystal display and its driving method. This includes improvements in contrast and reflectivity, ultimately providing users with a superior viewing experience.

The present invention provides a cholesterol liquid crystal display and driving method thereof. The cholesterol liquid crystal display comprises a display panel and a liquid crystal driving unit.

The display panel is used to display images composed of a row of imaging drive pixels and multiple rows of non-imaging drive pixels. The liquid crystal driving unit concurrently activates the display panel to display the image by using a plurality of the first driving voltages applied to the non-imaging drive pixels and a plurality of the second driving voltages applied to the imaging drive pixels. The first driving voltage has a quantity of the first pulse waves in a unit time, while the second driving voltage has a quantity of the second pulse waves in the unit time, where the quantity of the first pulse waves exceeds the quantity of the second pulse waves.

The display panel features multiple common electrode scan lines (COM Line), which are electrically coupled to the liquid crystal driving unit for image display. The imaging driving pixels are triggered by at least one common electrode scan line with a second driving voltage, characterized by the quantity of the second pulse waves. Besides, the non-imaging driving pixels are activated by other common electrode scan lines with a first driving voltage, distinguished by the quantity of the first pulse waves. The common electrode scan lines with the first driving voltage may influence the overall reflectivity, making the image brighter or darker based on voltage or time parameters. However, this ultimately does not impact the imaging effect.

The quantity of the first pulse waves within a unit time is at least 5 times greater than the quantity of the second pulse waves, and the higher the multiple, the better the display effect.

Moreover, the second driving voltage is categorized as a Selection voltage, while the first driving voltage is designated as a Non-Selection voltage.

The first driving voltage also exhibits a wave peak and a wave valley, and these features persist for a period of time respectively.

The unit time is defined as either a positive half-wave period or a negative half-wave period. In other words, each of the positive half-wave period and the negative half-wave period can be used to represent the unit time, respectively.

In one embodiment, the quantity of the first pulse waves in the positive half-wave period of the unselected voltage may be equal to or not equal to the quantity of the first pulse waves in the negative half-wave period.

In one embodiment, the first pulse wave frequency within the unit time is determined by the quantity of the first pulse waves, and similarly, the second pulse wave frequency within the unit time is determined by the quantity of the second pulse waves. In the unselected state, part of the first pulse wave frequency in the positive or negative half-wave period may be either equal or unequal to the other part of the first pulse wave frequency.

In one embodiment, the quantity of the first pulse waves within the unit time determines the first pulse wave frequency, while the quantity of the second pulse waves within the unit time determines the second pulse wave frequency. Consequently, the non-equal voltage peak frequency is designated as the first pulse wave frequency of either the positive half-wave period or the negative half-wave period in the unselected state.

In another embodiment, the quantity of the first pulse waves represents a quantity of multiple first pulse waves within the unit time. The peak value of the first pulse waves during either the positive or negative half-wave period in the unselected state is a fixed voltage for a specific duration.

Furthermore, the present invention also discloses a driving method for a cholesteric liquid crystal display. The display panel is designed for displaying images, where the images are produced by one imaging driving pixel and several non-imaging driving pixels. The driving method encompasses the following steps:

Step: Apply a first driving voltage with a quantity of the first pulse waves to the non-imaging driving pixel within a unit time. Meanwhile, apply a second driving voltage with a quantity of the second pulse waves to the imaging driving pixel within the same unit time to drive the display panel. Note that the quantity of the first pulse waves exceeds the quantity of the second pulse waves.

Step: The display panel is used to display the images.

The display panel has a plurality of common electrode scan lines which are electrically connected to the liquid crystal driving unit for image display. An imaging driving pixel is activated by at least one common electrode scan line using a second driving voltage with the quantity of the second pulse waves. Besides, the non-imaging driving pixels are activated by other common electrode scan lines using a first driving voltage with the quantity of the first pulse waves.

Furthermore, within the unit time, the quantity of the first pulse waves is at least 5 times greater than the quantity of the second pulse waves, and the greater the multiple, the better the display effect.

The second driving voltage is assigned as a Selection voltage, and the first driving voltage is assigned as a Non-Selection voltage.

The first driving voltage also exhibits a wave peak and a wave valley, and the wave peak and the wave valley persist within their time intervals respectively.

The unit time is defined as either a positive or negative half-wave period.

In still another embodiment, the quantity of the first pulse waves in the positive half-wave period of the unselected voltage may be equal to or not equal to the quantity of the first pulse waves in the negative half-wave period.

In one embodiment, the quantity of the first pulse waves within the unit time represents a first pulse wave frequency, while the quantity of the second pulse waves within the unit time represents a second pulse wave frequency. In the unselected state, part of the first pulse wave frequency in the positive or negative half-wave period may be either equal or unequal to the other part of the first pulse wave frequency.

In one embodiment, the quantity of the first pulse waves within the unit time determines the first pulse wave frequency, while the quantity of the second pulse waves within the unit time determines the second pulse wave frequency. Consequently, the non-equal voltage peak frequency is designated as the first pulse wave frequency of either the positive half-wave period or the negative half-wave period in the unselected state.

In another embodiment, the quantity of the first pulse waves represents a quantity of multiple first pulse waves within the unit time. The peak value of the first pulse waves during either the positive or negative half-wave period in the unselected state is a fixed voltage for a specific duration.

Therefore, the present invention provides a cholesteric liquid crystal display and its driving method. By employing various high-frequency methods during the unselected state within different unit times, the display achieves enhancements such as increased contrast or improved reflectivity. Within the unit time, the quantity of first pulse waves is at least 5 times greater than the quantity of second pulse waves, with a higher multiple correlating to a better display effect.

The aforementioned illustrations are exemplary for the purpose of further explaining the scope of the present invention. Other objectives and advantages related to the present invention will be illustrated in the subsequent descriptions and appended drawings. [0001]

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

The purpose of the present invention is to enhance the display effect of a cholesteric liquid crystal display and its driving method, aiming to improve contrast, increase reflectivity, reduce black shadows, and enhance the user's viewing experience.

Figure 8:
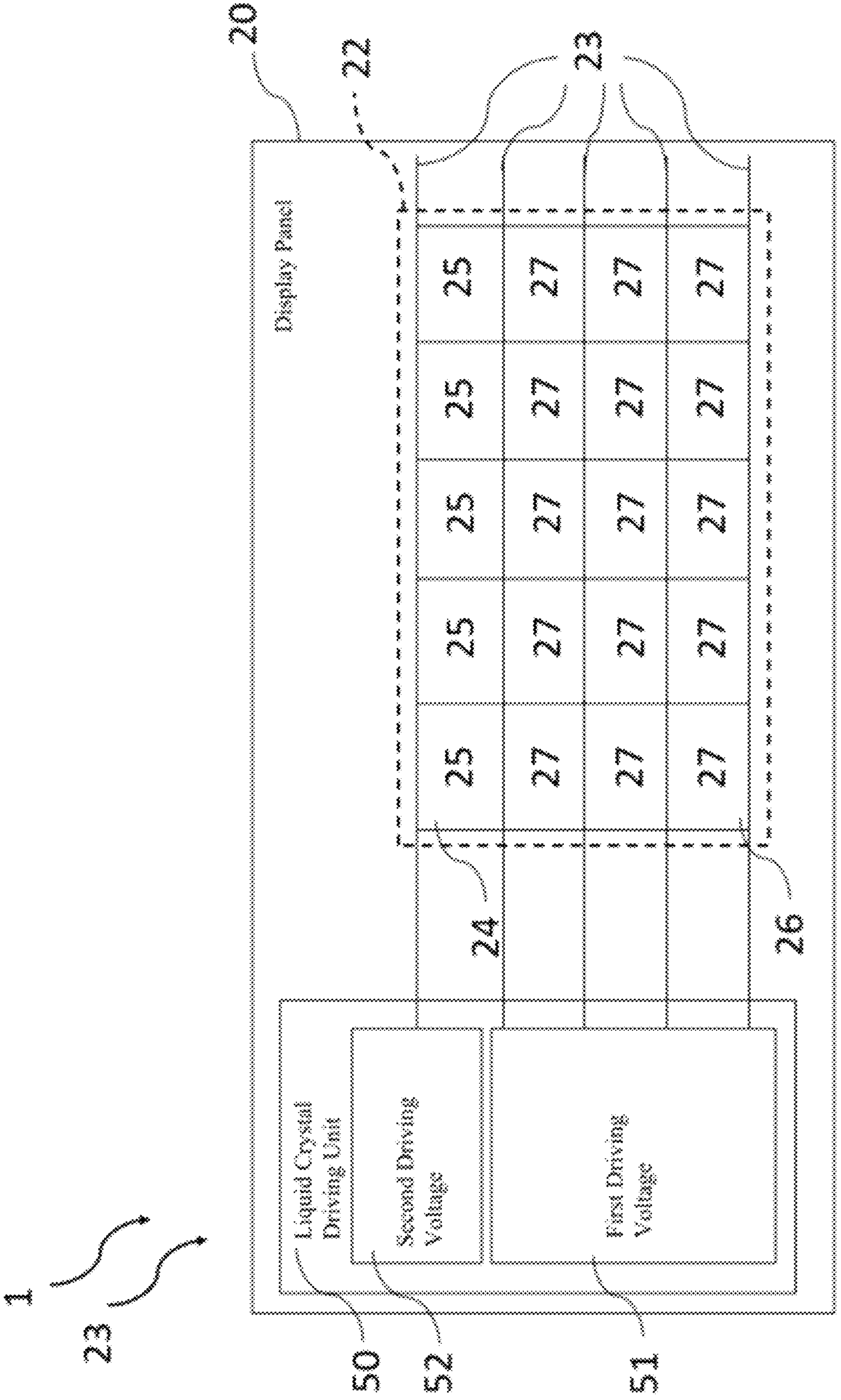
FIG. 8 is a schematic diagram of the cholesteric liquid crystal display of the present invention.
Figure 9:
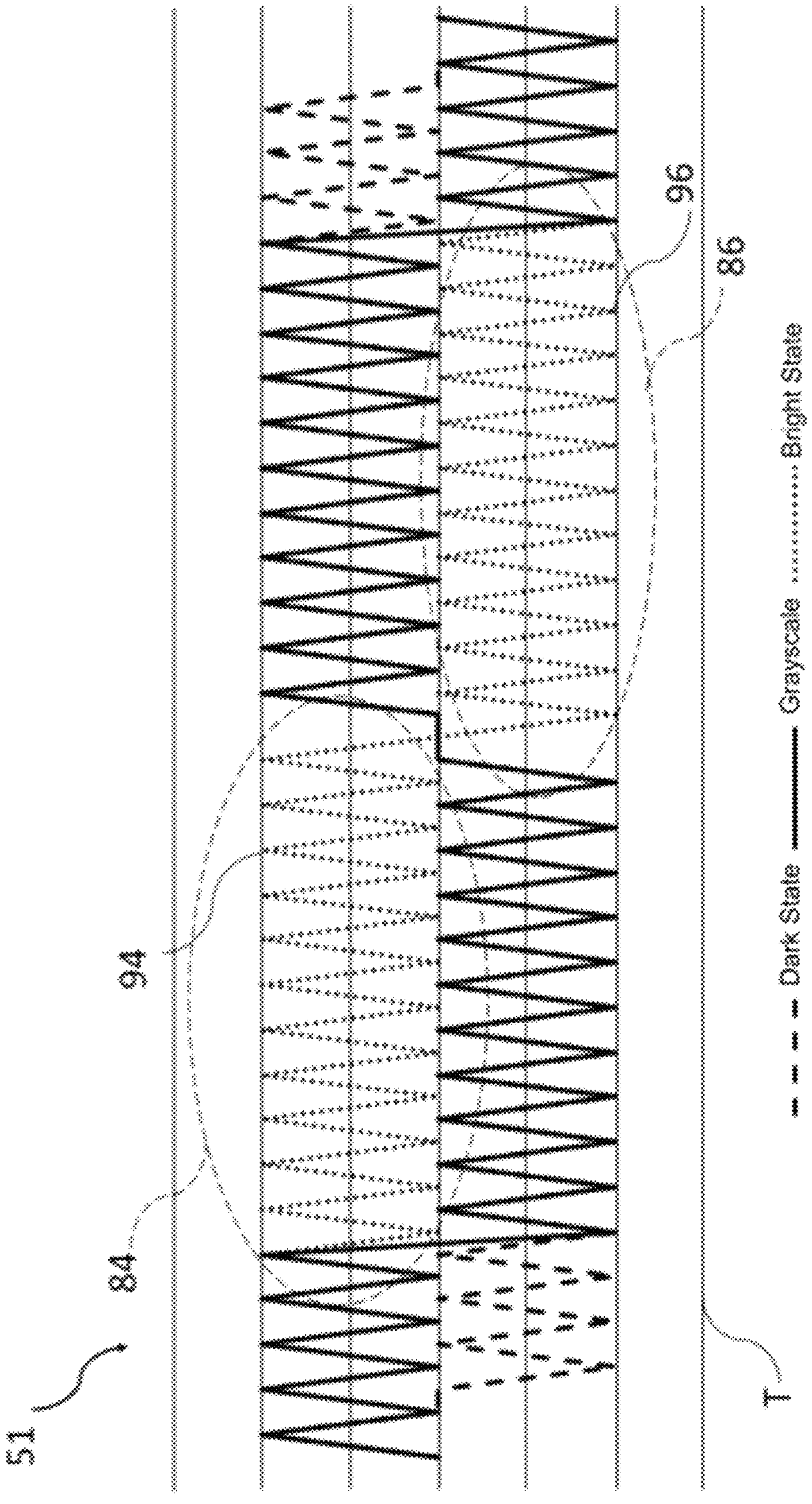
FIG. 9 is a waveform diagram of the Non-Selection stage within a unit time in the first embodiment of the present invention.

The present invention relates to a cholesteric liquid crystal display. Please refer to FIGS. 8 and 9 for details. FIG. 8 illustrates a schematic diagram of the cholesteric liquid crystal display, while FIG. 9 presents a waveform diagram of the first embodiment of the Non-Selection stage within a unit time, illustrating an embodiment with all high frequencies. The cholesteric liquid crystal display 1 comprises a display panel 20 and a liquid crystal driving unit 50.

The display panel 20 is used for displaying an image 22, which comprises an imaging driving pixel 24 and multiple non-imaging driving pixels 26. The imaging driving pixel 24 is further composed of multiple sub-imaging driving pixels 25, while a non-imaging driving pixel 26 consists of multiple sub-non-imaging driving pixels 27.

The liquid crystal driving unit 50 concurrently drives the display panel 20 to display the image 22 using multiple first driving voltages 51 for the non-imaging driving pixels 26 and a second driving voltage 52 for the imaging driving pixels 24. The second driving voltage 52 may serve as a selected voltage, while the first driving voltage 51 may act as an unselected voltage.

Figure 1:
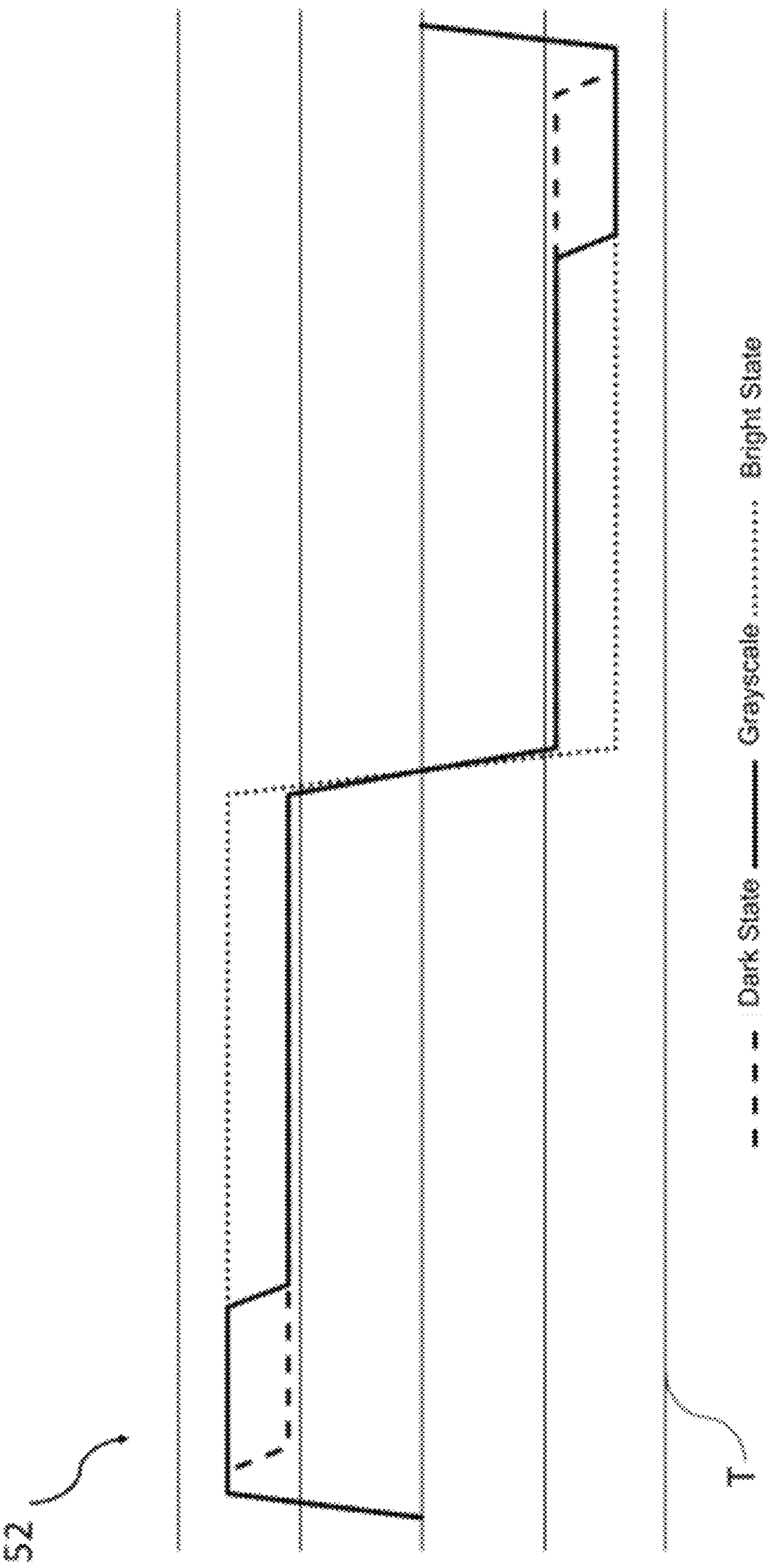
Fig. 1 (Prior Art)
FIG. 1 is a waveform diagram of the Selection stage of the PWM driving mode in the prior art.
Figure 2:
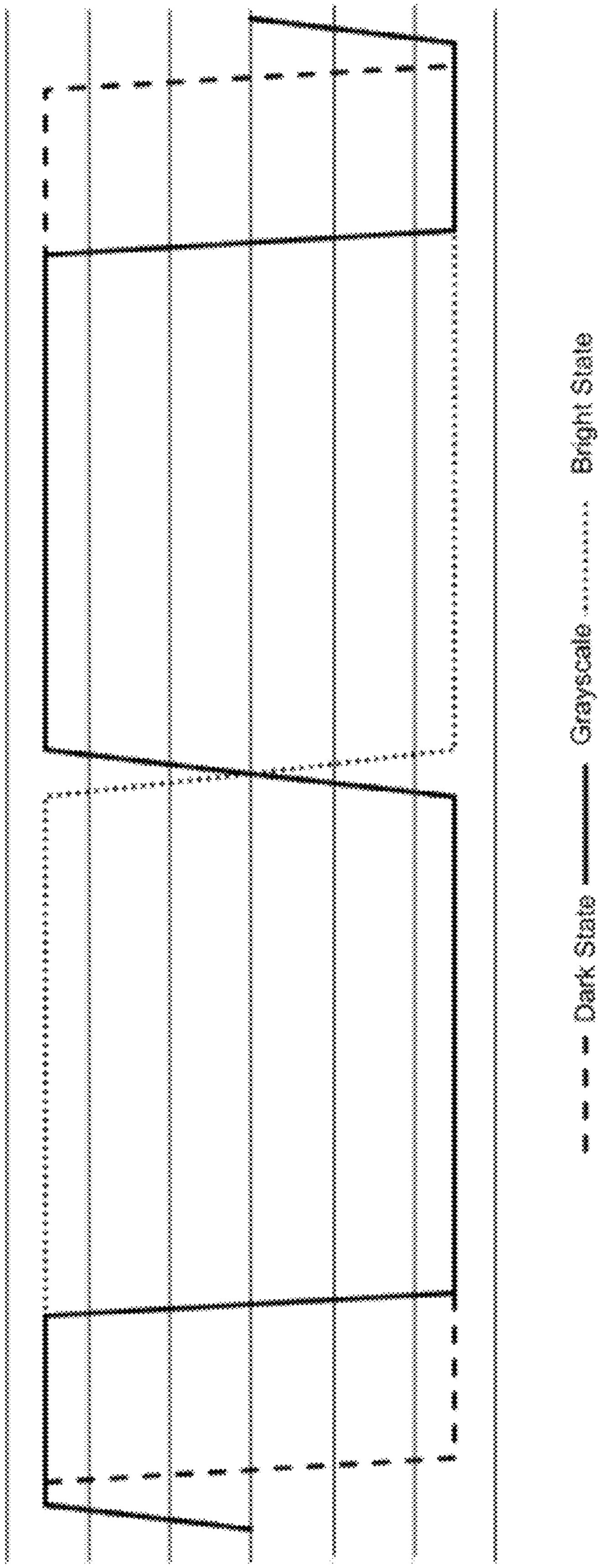
Fig. 2 (Prior Art)
FIG. 2 is a waveform diagram of the Non-Selection stage of the PWM driving mode in the prior art.
Figure 3:
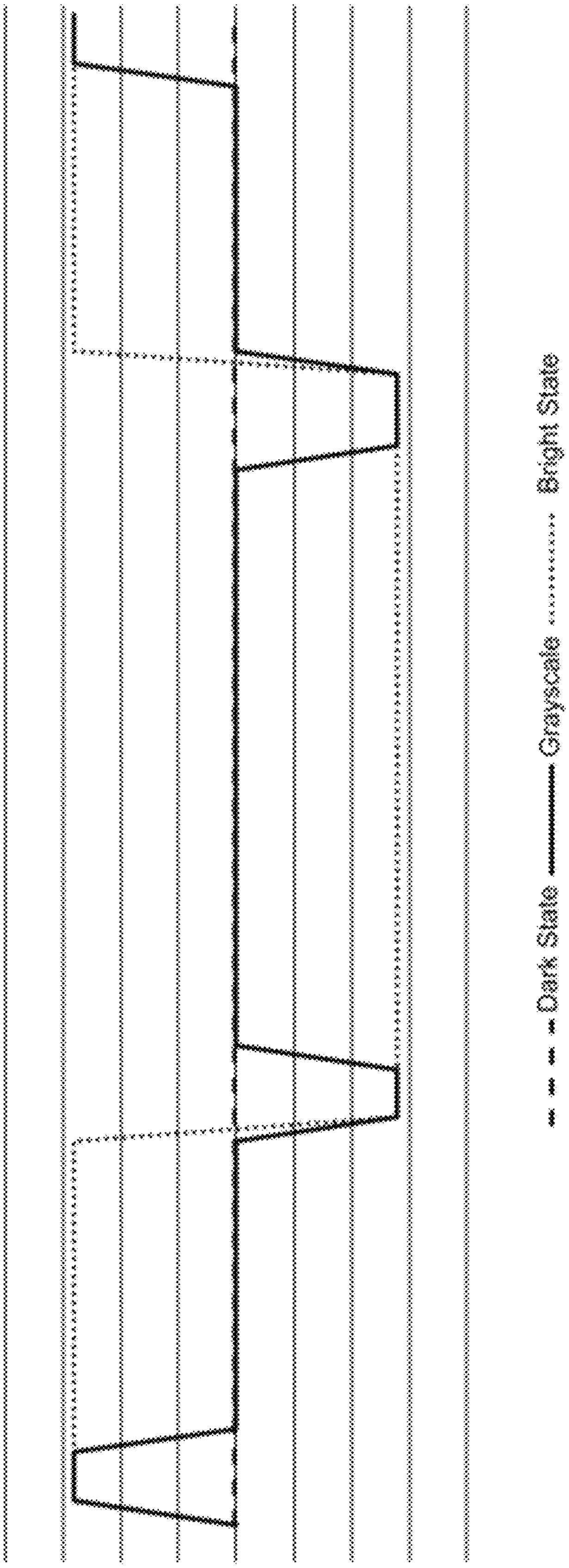
Fig. 3 (Prior Art)
FIG. 3 is a waveform diagram of the first type of the Selection stage of the DDS driving mode in the prior art.
Figure 4:
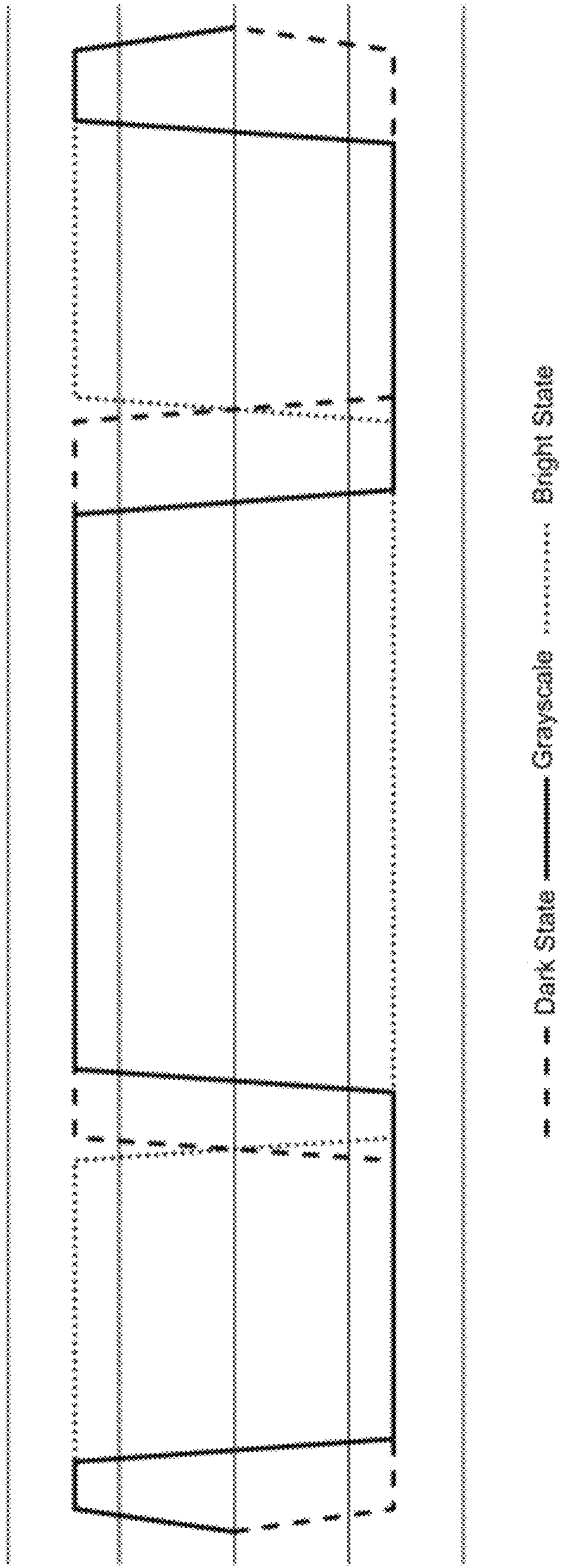
Fig. 4 (Prior Art)
FIG. 4 is a waveform diagram of the first type of the Non-Selection stage of the DDS driving mode in the prior art.
Figure 5:
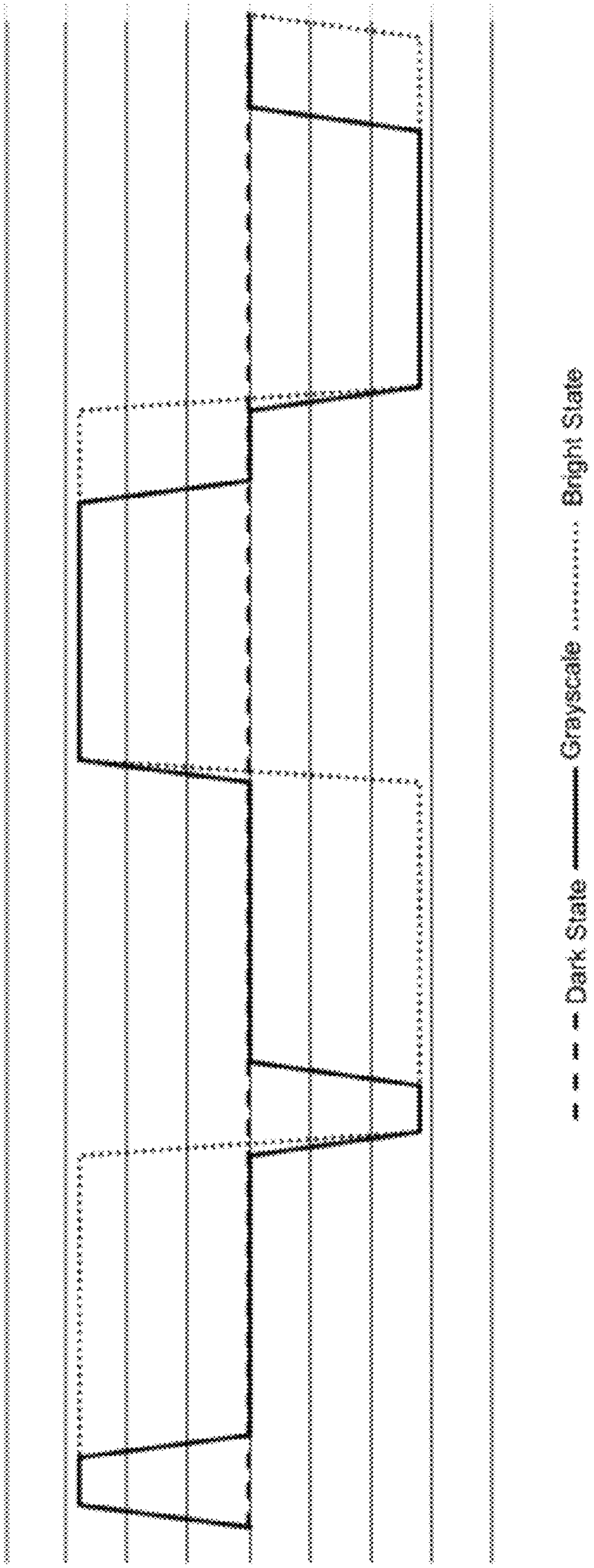
Fig. 5 (Prior Art)
FIG. 5 is a waveform diagram of the second type of the Selection stage of the DDS driving mode in the prior art.
Figure 6:
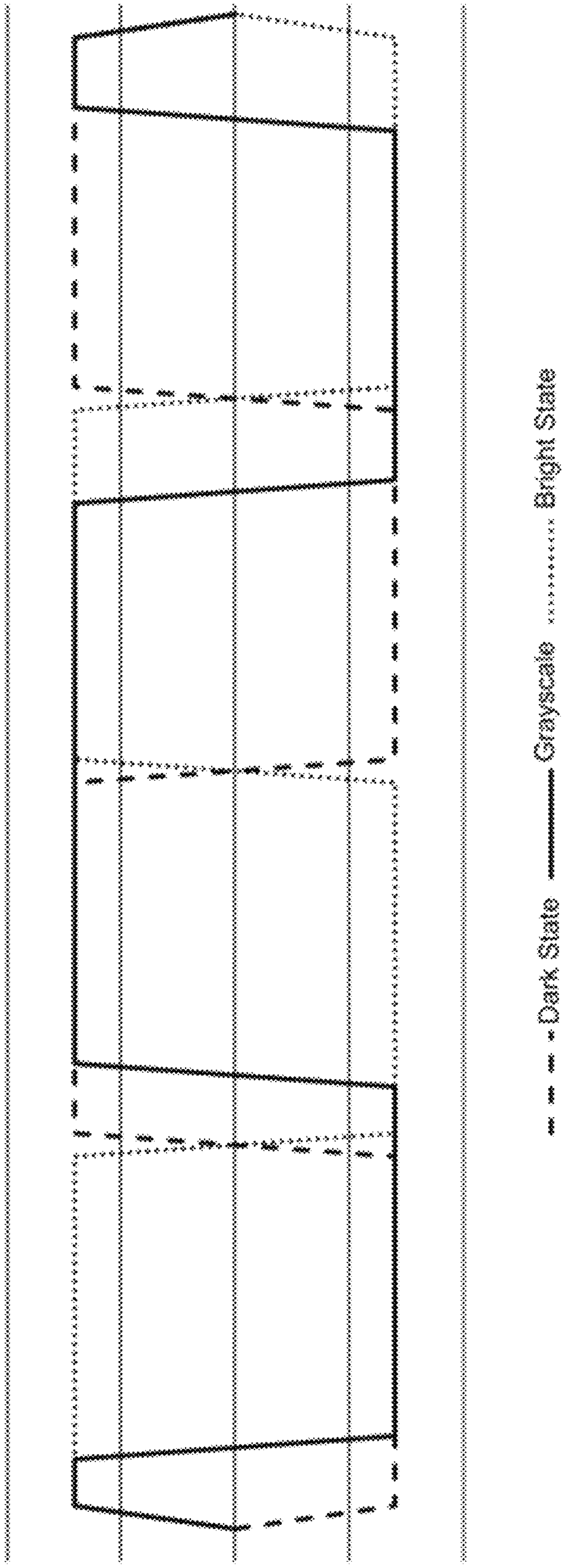
Fig. 6 (Prior Art)
FIG. 6 is a waveform diagram of the second type of the Non-Selection stage of the DDS driving mode in the prior art.

Comparing FIGS. 1 and 9, FIG. 1 shows the waveform of the second driving voltage, while FIG. 9 illustrates the waveform of the first driving voltage. In the same unit time T, the first driving voltage 51 has a quantity of first pulse waves, and the second driving voltage 52 has a quantity of second pulse waves. Additionally, through comparison, it is evident that within the unit time T, the quantity of the first pulse waves exceeds the quantity of the second pulse waves. Experiments have demonstrated that the quantity of the first pulse waves is at least 5 times greater than the quantity of the second pulse waves. A higher multiple correlates with a better display effect, resulting in fewer black shadows in the aforementioned photograph.

Furthermore, the display panel 20 comprises multiple common electrode scan lines 23, electrically connected to the liquid crystal driving unit 50 for image display. The imaging driving pixels 24 are activated by at least one common electrode scan line 23 supplied by the second driving voltage 52 with the quantity of the second pulse waves, while the non-imaging driving pixels 26 are driven by other common electrode scan lines 23 supplied by the first driving voltages 51 with the quantity of the first pulse waves. The common electrode scan lines 23, supplied by the first driving voltage 51, may influence the overall reflectivity to be brighter or darker due to voltage or time parameters, but it does not significantly impact the imaging effect.

By taking the bright state curve in FIG. 9 for example. The first driving voltage 51 exhibits a wave peak 94 and a wave valley 96, with the unit time T representing either a positive half-wave period 84 or a negative half-wave period 86. In other words, the positive half-wave period 84 and the negative half-wave period 86 can each represent the unit time T, and the unit times T of the positive half-wave period 84 and the negative half-wave period 86 may be the same or different.

As depicted in FIG. 9, the quantity of the first pulse waves in the positive half-wave period 84 equals the quantity of the first pulse waves in the negative half-wave period 86 within the unit time T. Furthermore, when compared with FIG. 1, the quantity of the first pulse waves exceeds the quantity of the second pulse waves in both the positive half-wave period 84 and the negative half-wave period 86. In alternative embodiments, the quantity of the first pulse waves in the positive half-wave period 84 and the quantity of the first pulse waves in the negative half-wave period 86 within the unit time T may differ.

Figure 10:
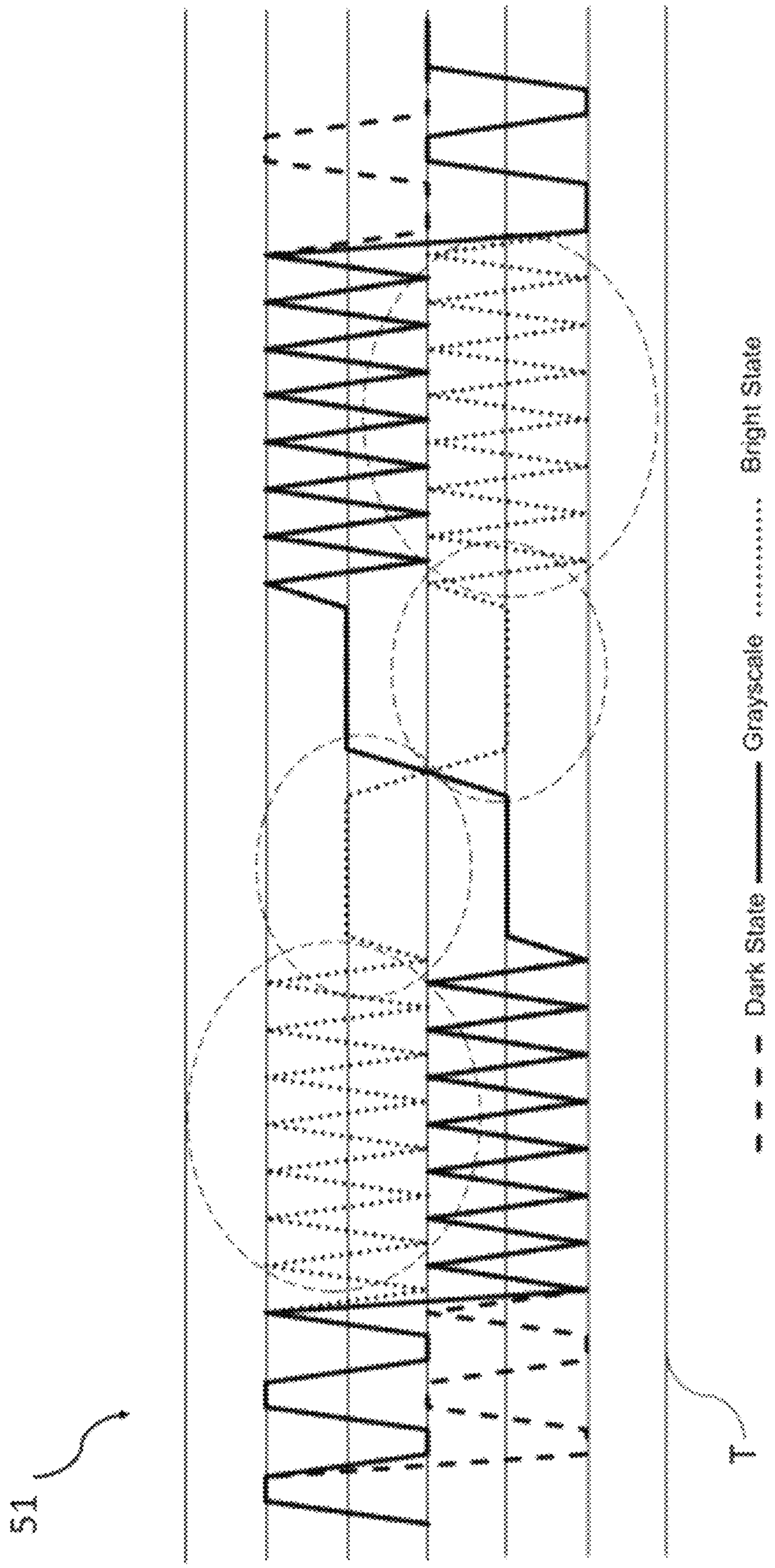
FIG. 10 is a waveform diagram of the Non-Selection stage within a unit time in the second embodiment of the present invention.

Please refer to FIG. 10 and compare it with FIG. 1. FIG. 10 illustrates a waveform diagram of the Non-Selection stage within a unit time according to the second embodiment of the present invention. In both figures, regarding the first driving voltage 51, the quantity of the first pulse waves in unit time T is the first pulse wave frequency, and concerning the second driving voltage 52, the quantity of the second pulse waves in unit time T is the second pulse wave frequency. Comparatively, the first pulse wave frequency within unit time T exceeds the second pulse wave frequency. Using the bright waveform in FIG. 10 as an illustration, the first pulse wave frequency is selected from the positive half-wave period 84 and the negative half-wave period 86 within unit time T, respectively. These frequencies constitute the first pulse wave frequency in one part and the second pulse wave frequency in another part, and the two frequencies may differ.

Figure 11:
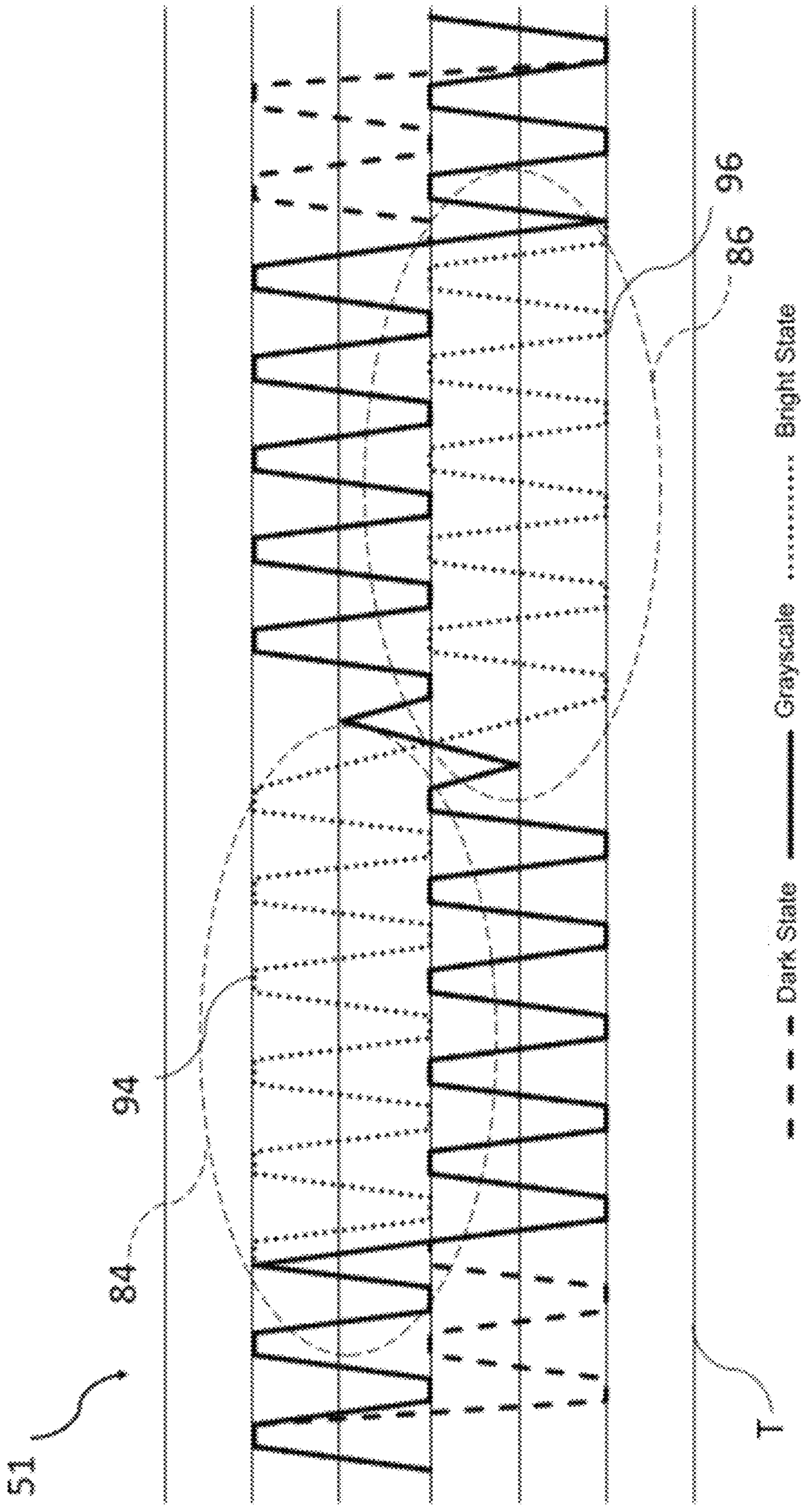
FIG. 11 is a waveform diagram of the Non-Selection stage within a unit time in the third embodiment of the present invention.

Refer to FIG. 11, which illustrates a waveform diagram of the Non-Selection stage within a unit time in the third embodiment of the present invention. In the unit time T, the positive half-wave period 84 and the negative half-wave period 86 may have discontinuous waveforms. Using the bright waveform in FIG. 11 as an illustration, the wave peak 94 and the wave valley 96 of the first pulse wave in the positive half-wave period 84 and the negative half-wave period 86 persist for a specific time within the unit time T respectively. This persistence is aimed at energy conservation, addressing the energy consumption issues that may arise in the cholesterol liquid crystal display 1 when undergoing instantaneous voltage conversion.

Figure 12:
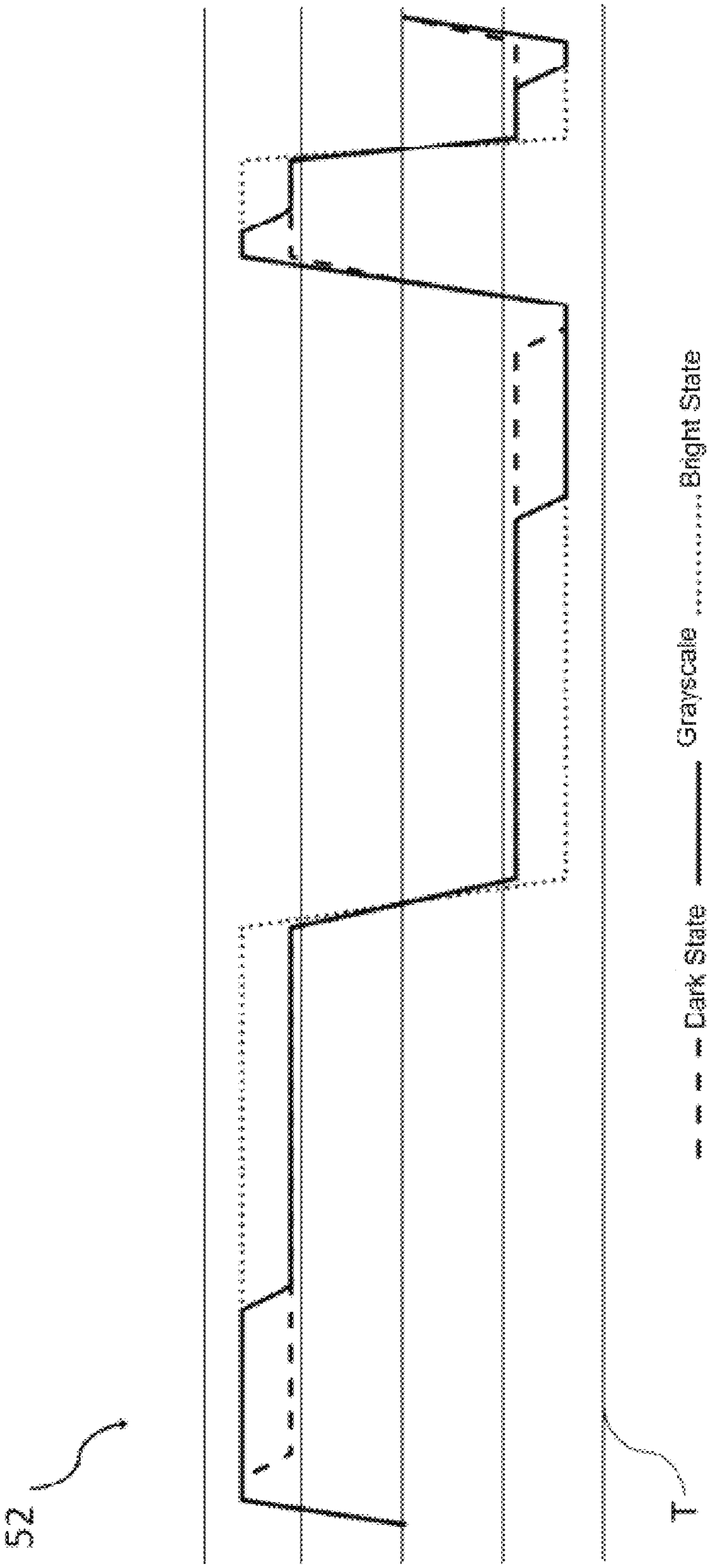
Fig. 12 (Prior Art)
FIG. 12 is a waveform diagram of the Selection stage of the complex PWM driving mode in the prior art.
Figure 13:
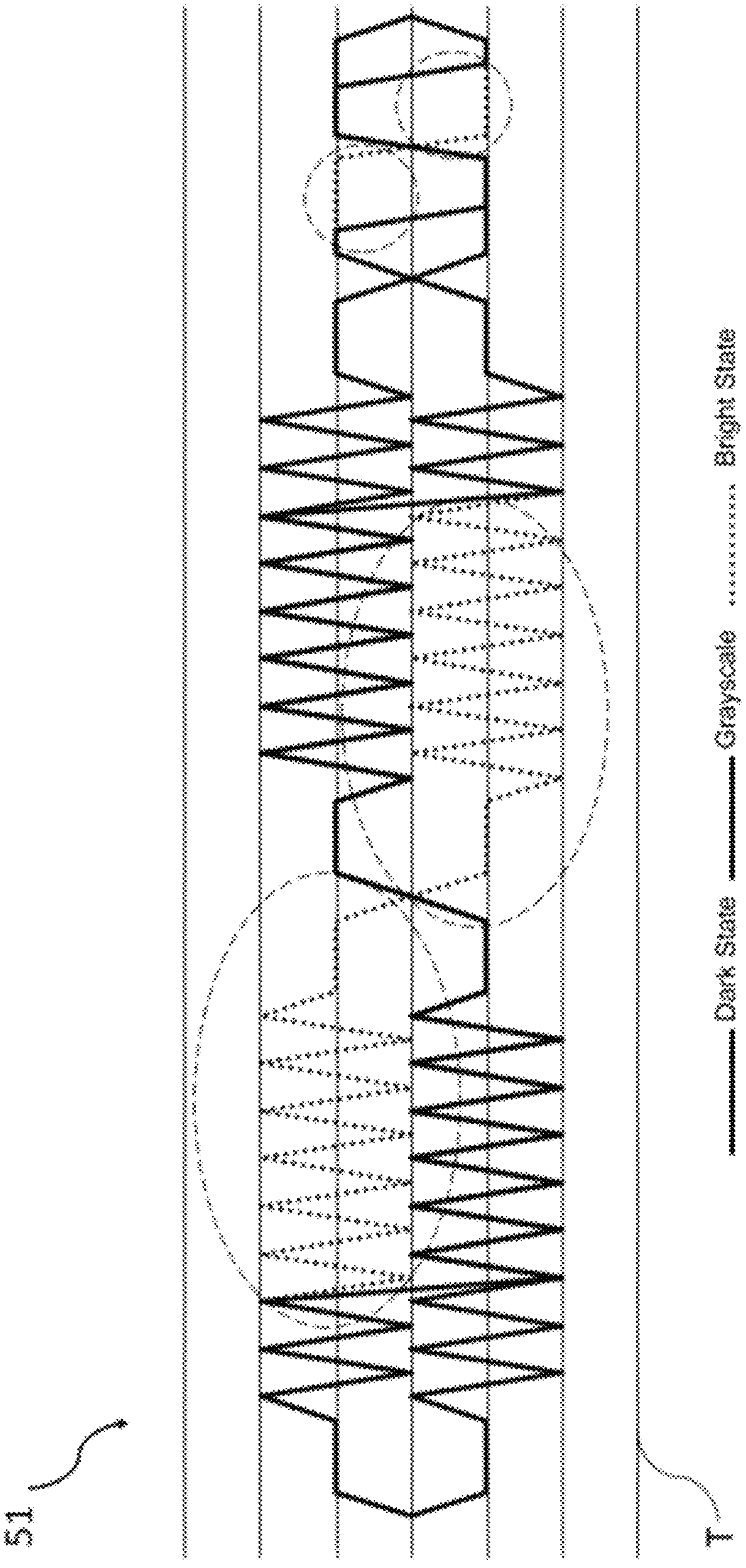
FIG. 13 is a waveform diagram of the Non-Selection stage within a unit time in the fourth embodiment of the present invention.

Refer to FIG. 13 and compare it with FIG. 12 and FIG. 1. FIG. 13 depicts a waveform diagram of the Non-Selection stage within a unit time in the fourth embodiment of the present invention, which is a complex PWM drive mode. FIG. 12 illustrates a waveform diagram of the Selection stage in the complex PWM driving mode in the prior art. Comparing FIG. 1 with FIG. 12, the latter exhibits twice the quantity and frequency of the second pulse waves within the unit time T, classifying it as a complex driving mode. Referring again to FIG. 13, concerning the first driving voltage 51, when the quantity of the first pulse waves corresponds to multiple waves within the unit time T, both the positive half-wave period 84 and the negative half-wave period 86 exhibit this quantity of the first pulse waves as circled in FIG. 13. The peak value of the first pulse wave in the unselected voltage during the positive half-wave period 84 and the negative half-wave period 86 remains at a fixed voltage for a specific duration. The frequency and quantity of the first pulse waves in the positive half-wave period 84 may differ from those in the negative half-wave period 86. Upon comparing FIG. 13 with FIG. 12, it becomes evident that, as previously mentioned, the first driving voltage 51 exhibits a higher quantity and frequency within the unit time T than the second driving voltage 52.

Figure 14:
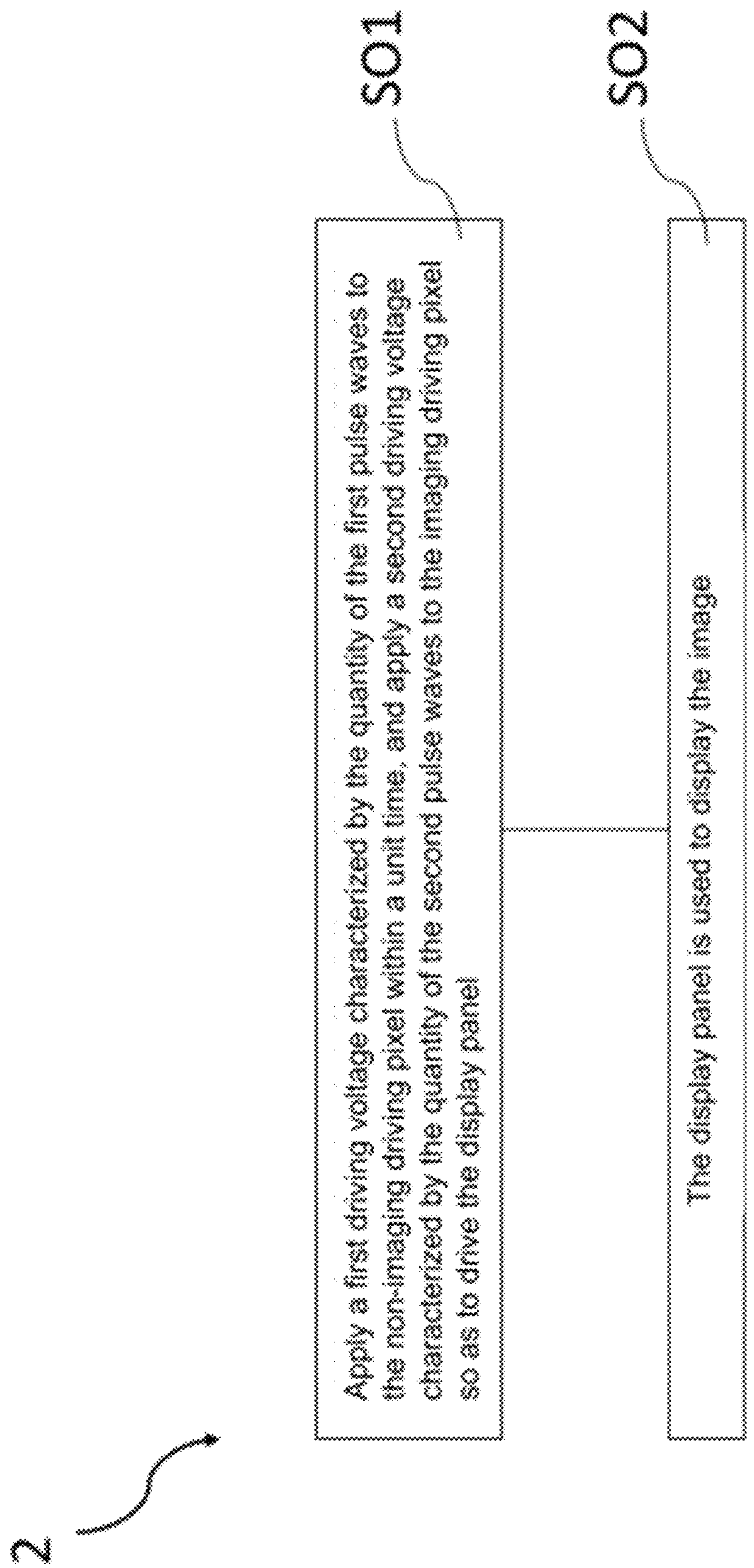
FIG. 14 is a flowchart of the cholesteric liquid crystal display driving method of the present invention.

Furthermore, the present invention also provides a driving method 2 for a cholesteric liquid crystal display. Please refer to FIG. 14 in conjunction with FIG. 8, where FIG. 14 depicts a flowchart of a driving method for a cholesteric liquid crystal display of the present invention. The cholesteric liquid crystal display includes a display panel 20 used to display an image 22, and the image 22 is composed of an imaging driving pixel 24 and a plurality of non-imaging driving pixels 26. The driving method includes the following steps:

Step 1 (S01): Apply a first driving voltage 51 characterized by the quantity of the first pulse waves to the non-imaging driving pixel 26 within a unit time T. Simultaneously, apply a second driving voltage 52 characterized by the quantity of the second pulse waves to the imaging driving pixel 24. It is noteworthy that the quantity of the first pulse waves exceeds the quantity of the second pulse waves.

Step 2 S02: The display panel 20 is used to display the image 22.

As stated previously, the display panel 20 is equipped with multiple common electrode scan lines 23. These common electrode scan lines 23 are electrically connected to the liquid crystal driving unit 50 to facilitate the display of the image 22. Specifically, the imaging driving pixel 24 is activated through the utilization of at least one common electrode scan line 23 that employs the second driving voltage 52 characterized by the quantity of the second pulse waves. Besides, the non-imaging driving pixels 26 are activated through the utilization of other one common electrode scan lines 23 that employs the first driving voltage 51 characterized by the quantity of the first pulse waves.

Moreover, the quantity of first pulse waves within the unit time T is at least 5 times greater than the quantity of second pulse waves, and the higher the multiple, the more pronounced the display effect.

Figure 7:
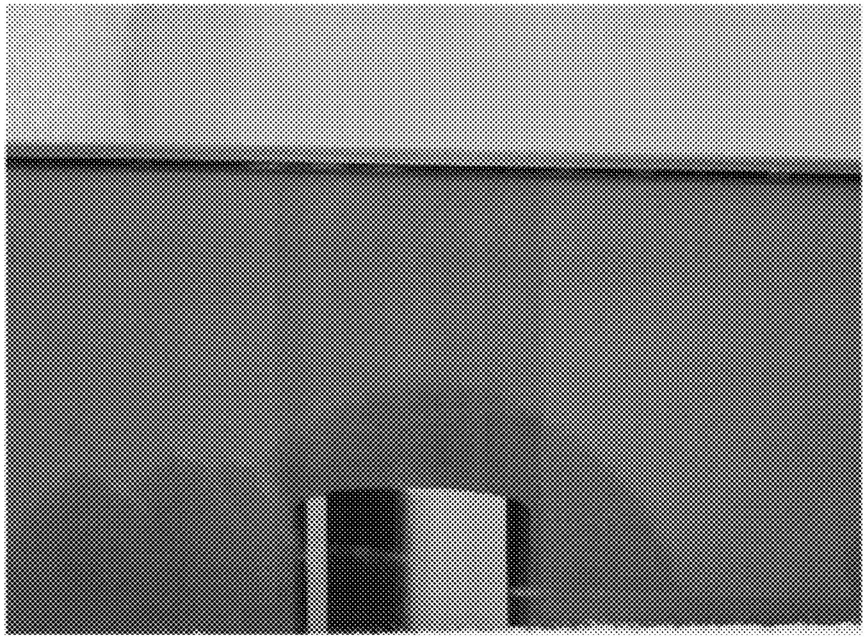
Fig. 7 (Prior Art)
FIG. 7 is a photography depicting the actual performance of the prior art.
Figure 15:
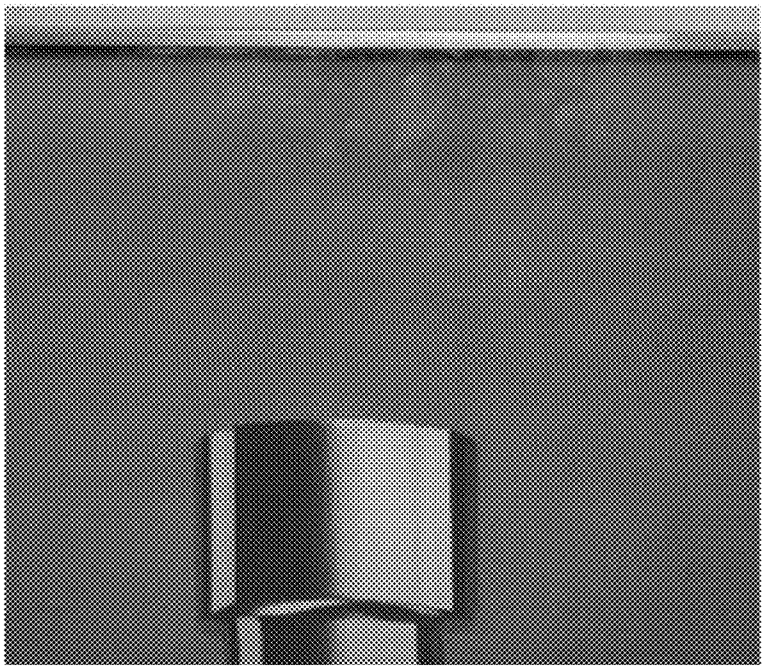
FIG. 15 is a photography depicting the actual performance according to the first embodiment of the present invention.
Figure 16:
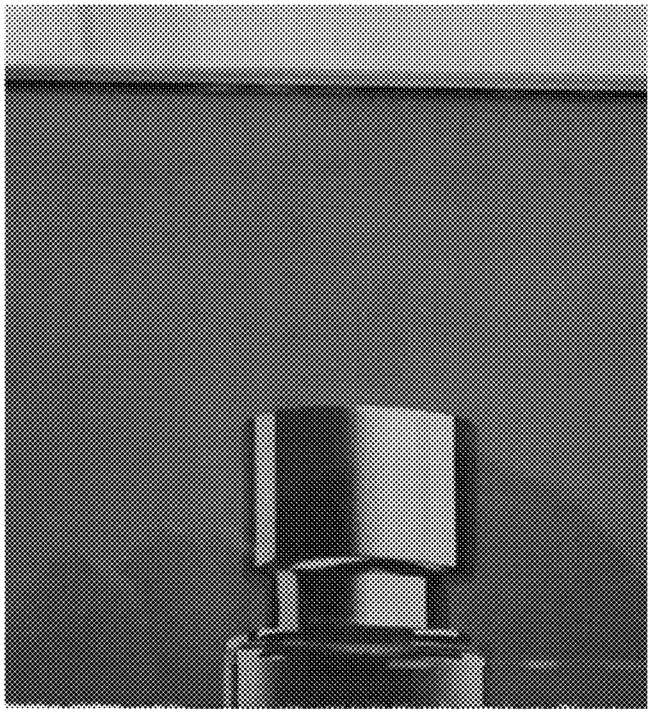
FIG. 16 is a photography depicting the actual performance according to the second embodiment of the present invention.

Please refer to FIGS. 15 and 16 and compare them with FIG. 7. FIG. 15 presents a photograph illustrating the actual performance in accordance with the first embodiment of the present invention. This image captures a state where the first driving voltage 51 is fully applied in a high-frequency voltage. FIG. 16 illustrates a photograph depicting the actual performance of the second embodiment according to the present invention, explaining a situation where the first driving voltage 51 is partially applied in a high-frequency voltage. In comparison with FIG. 7, applying the first driving voltage 51 at a high frequency results in a better display effect than the original display shown in FIG. 7. In other words, fewer black shadows are produced in the bottle cap observed from the center of the photograph. Experiments show that the effect of the first driving voltage 51, fully embodied in high-frequency voltage, is superior to the display effect when only partially embodied in high-frequency voltage. Specifically, in the state where the first driving voltage 51 is fully applied in high-frequency voltage, fewer black shadows are observed.

Therefore, the present invention introduces a cholesteric liquid crystal display and its driving method. It is evident that employing various high-frequency methods within different unit times T in the unselected state, such as fully applying the first driving voltage 51 in high frequency, partially in high frequency, or with discontinuous high frequency, serves to enhance contrast and improve reflectivity. It is important to note that, within the unit time T, the quantity of the first pulse waves is at least 5 times greater than the quantity of the second pulse waves. The higher this multiple, the more favorable the display effect, resulting in fewer black shadows being produced.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesterol liquid crystal display, comprising:

a display panel, used to display an image which comprises a row of imaging drive pixels and multiple rows of non-imaging drive pixels; and a liquid crystal driving unit, driving the display panel to show the image by applying a first driving voltage to multiple non-imaging drive pixels and a second driving voltage to imaging drive pixels concurrently, wherein the first driving voltage has a quantity of first pulse waves within a unit time, and the second driving voltage has a quantity of second pulse waves within the unit time, and wherein the quantity of the first pulse waves exceeds the quantity of the second pulse waves within the unit time.

2. The cholesterol liquid crystal display according to claim 1, wherein the display panel comprises multiple common electrode scan lines, which are electrically coupled to the liquid crystal driving unit for image display, and the imaging driving pixels are activated by at least one common electrode scan line with the second driving voltage distinguished by the quantity of the second pulse waves, and the non-imaging driving pixels are activated by other common electrode scan lines with the first driving voltage distinguished by the quantity of the first pulse waves.

3. The cholesterol liquid crystal display according to claim 1, wherein the quantity of the first pulse waves is at least 5 times greater than the quantity of the second pulse waves within the unit time.

4. The cholesterol liquid crystal display according to claim 1, wherein the second driving voltage is a Selection voltage, while the first driving voltage is a Non-Selection voltage.

5. The cholesterol liquid crystal display according to claim 1, wherein the first driving voltage comprises a wave peak and a wave valley, and both the wave peak and the wave valley persist for a period of time respectively.

6. The cholesterol liquid crystal display according to claim 3, wherein the unit time is either a positive half-wave period or a negative half-wave period.

7. The cholesterol liquid crystal display according to claim 6, wherein the quantity of the first pulse waves in the positive half-wave period of the first driving voltage being an unselected voltage may be equal to or not equal to the quantity of the first pulse waves in the negative half-wave period of the unselected voltage.

8. The cholesterol liquid crystal display according to claim 6, wherein the quantity of the first pulse waves within the unit time is a first pulse wave frequency, while the quantity of the second pulse waves within the unit time is a second pulse wave frequency, and in an unselected state of a region to which the first driving voltage as a Non-Selection voltage is applied, a part of the first pulse wave frequency in the positive or negative half-wave period may be either equal or unequal to the other part of the first pulse wave frequency.

9. The cholesterol liquid crystal display according to claim 6, wherein the quantity of the first pulse waves within the unit time is a first pulse wave frequency, while the quantity of the second pulse waves within the unit time is a second pulse wave frequency, so that a non-equal voltage peak frequency is defined as the first pulse wave frequency of either the positive half-wave period or the negative half-wave period in an unselected state of a region to which the first driving voltage as a Non-Selection voltage is applied.

10. The cholesterol liquid crystal display according to claim 6, wherein the quantity of the first pulse waves is a quantity of multiple first pulse waves within the unit time, and the peak value of the first pulse waves during either the positive or negative half- wave period in an unselected state of a region to which the first driving voltage as a Non-Selection voltage is applied is a fixed voltage for a specific duration.

11. A driving method for a cholesteric liquid crystal display which comprises a display panel for displaying an image, where the image is produced by one imaging driving pixel and several non-imaging driving pixels, the driving method comprises the following steps:

applying a first driving voltage with a quantity of first pulse waves to a non-imaging driving pixel within a unit time, and applying a second driving voltage with a quantity of second pulse waves to an imaging driving pixel within the same unit time to drive the display panel, wherein the quantity of the first pulse waves exceeds the quantity of the second pulse waves; and displaying the image by the display panel.

12. The driving method for a cholesteric liquid crystal display according to claim 11, wherein the display panel comprises a plurality of common electrode scan lines which are electrically connected to the liquid crystal driving unit for image display, an imaging driving pixel is activated by at least one common electrode scan line using a second driving voltage with the quantity of the second pulse waves, and the non-imaging driving pixels are activated by other common electrode scan lines using a first driving voltage with the quantity of the first pulse waves.

13. The driving method for a cholesteric liquid crystal display according to claim 11, wherein the quantity of the first pulse waves within the unit time is at least 5 times greater than the quantity of the second pulse waves.

14. The driving method for a cholesteric liquid crystal display according to claim 11, wherein the second driving voltage is a Selection voltage, while the first driving voltage is a Non-Selection voltage.

15. The driving method for a cholesteric liquid crystal display according to claim 11, wherein the first driving voltage comprises a wave peak and a wave valley, and both the wave peak and the wave valley persist for a period of time respectively.

16. The driving method for a cholesteric liquid crystal display according to claim 13, wherein the unit time is either a positive half-wave period or a negative half-wave period.

17. The driving method for a cholesteric liquid crystal display according to claim 16, wherein the quantity of the first pulse waves in the positive half-wave period of the first driving voltage being an unselected voltage is either equal to or not equal to the quantity of the first pulse waves in the negative half-wave period.

18. The driving method for a cholesteric liquid crystal display according to claim 16, wherein the quantity of the first pulse waves within the unit time is a first pulse wave frequency, the quantity of the second pulse waves within the unit time is a second pulse wave frequency, so that in an unselected state of a region to which the first driving voltage as a Non-Selection voltage is applied, a part of the first pulse wave frequency in the positive or negative half-wave period is either equal or unequal to the other part of the first pulse wave frequency.

19. The driving method for a cholesteric liquid crystal display according to claim 16, wherein the quantity of the first pulse waves within the unit time is a first pulse wave frequency, while the quantity of the second pulse waves within the unit time is a second pulse wave frequency, so that a non-equal voltage peak frequency is defined as the first pulse wave frequency of either the positive half-wave period or the negative half-wave period in an unselected state of a region to which the first driving voltage as a Non-Selection voltage is applied.

20. The driving method for a cholesteric liquid crystal display according to claim 16, wherein the quantity of the first pulse waves is a quantity of multiple first pulse waves within the unit time, and the peak value of the first pulse waves during either the positive or negative half-wave period in an unselected state of a region to which the first driving voltage as a Non-Selection voltage is applied is a fixed voltage for a specific duration.

* * * * *